United States Patent Office 3,304,286
Patented Feb. 14, 1967

3,304,286
POLYESTER-POLYISOCYANATE MATERIALS AND
COATINGS OBTAINED THEREFROM
Siegfried Altscher, Union, and Morris N. Schneider,
Metuchen, N.J., assignors to Nopco Chemical Company, Newark, N.J., a corporation of New Jersey
No Drawing. Filed Jan. 29, 1963, Ser. No. 254,595
15 Claims. (Cl. 260—47)

This invention relates to new compositions of matter. More particularly, this invention relates to new compositions of matter, which are useful as polyester-polyisocyanate prepolymers, and to coating compositions and castings prepared therefrom.

Many polyisocyanate-polyester prepolymers are known in the art. These polyisocyanate-polyester prepolymers are extensively used in the manufacture of lacquers, elastomers, adhesives, etc. The polyisocyanate-polyester prepolymers previously prepared by the art are generally soluble only in polar oxygenated solvents. Generally speaking, even when the polyester itself is an extremely soluble one, upon reaction with a polyisocyanate, the resultant polyester-polyisocyanate prepolymer is usually soluble only in polar oxygenated solvents. These oxygenated solvents, e.g. ketones, ethers and esters, are expensive and are difficult to render anhydrous. Anhydrous solvents are essential when free isocyanate groups are present, as for example in a polyester-polyisocyanate prepolymer, because the slightest trace of water will cause the polyester-polyisocyanate prepolymer to become viscous or gel due to the reaction of water with the free isocyanate groups.

Accordingly, it is an object of this invention to provide prepolymers which are soluble in inexpensive non-polar solvents, which solvents can be readily rendered anhydrous.

Another object of this invention is to prepare coating compositions and casting compositions using the prepolymers of this invention.

Other objects and advantages will become more apparent from the following more complete description and claims.

It has been unexpectedly discovered that the above as well as other objects can be accomplished in the following manner.

Broadly, this invention contemplates a polyester prepolymer comprising the reaction product of (A) a polyester having free and unreacted hydroxy groups, said polyester being the reaction product of (1) a hydroxy component containing at least 60% by weight of alkylated aromatic glycol having the structure:

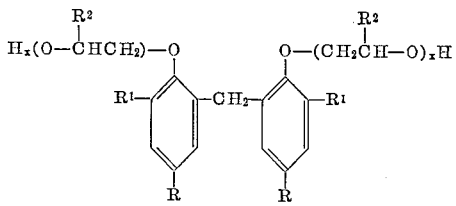

wherein R is an alkyl group of from 8 to 12 carbon atoms, R¹ and R² are selected from the group consisting of methyl and hydrogen, and x is an integer of from 1 to 2, with (2) a material selected from the class consisting of saturated and unsaturated aliphatic and aromatic dicarboxylic acids and anhydrides thereof, and (B) an isocyanate having about two free isocyanate groups, said isocyanate being present in an amount sufficient to provide from about 1.5 to 2.2 isocyanate groups for every free and unreacted hydroxyl group in the polyester. These polyester prepolymers are soluble in inexpensive non-polar solvents such as hydrocarbon solvents which allows them to be evenly applied to substances to be coated.

Generally speaking, the alkylated aromatic glycols which are utilized in the compositions of this invention may be prepared in the following manner. A para alkylated phenol or a para alkylated orthocresol is first reacted with formaldehyde. The resultant bisphenol is then reacted with from about two to four moles of ethylene oxide or propylene oxide, per mole of the bisphenol to form a condensate (glycol) conforming to the following structure:

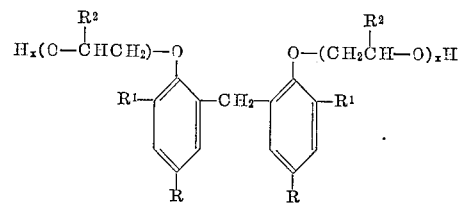

wherein R is an alkyl group of from 8 to 12 carbon atoms, x is an integer ranging from about 1 to about 2 and R¹ and R² are either a hydrogen or methyl group.

The compositions of this invention may be prepared from the alkylated aromatic glycol in the following manner. From about 1.3 to about 3 moles of the alkylated aromatic glycol are reacted with about one mole of the saturated or unsaturated dicarboxylic acid or anhydride or mixtures thereof to form a polyester having free or unreacted hydroxyl groups. This polyester is then reacted with a diisocyanate in an amount sufficient to provide a ratio of from about 1.5 to 2.2 isocyanate groups for every free or unreacted hydroxyl group within the polyester. In this manner the polyester prepolymer of this invention is provided having free or terminal isocyanate groups. If desired, the free isocyanate groups of the polyester prepolymer of this invention may be then blocked with a suitable blocking agent to prevent the prepolymer having free isocyanate groups from reacting with the moisture in the atmosphere until it is ready to be applied as a coating.

(A) *Preparation of the bisphenol.*—The bisphenols which are utilized in preparing the glycol may be prepared by reacting from 1.67 to 2.00 moles of a para alkylated phenol or a para alkylated ortho-cresol with one mol of formaldehyde or equivalent amounts of paraformaldehyde, trioxane, and the like. Condensation temperatures of from about 55 to 105° C. are maintained for about 2 to 6 hours. The resulting product is essentially a bisphenol of the formula:

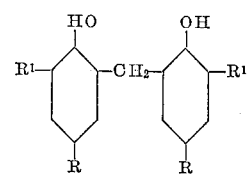

wherein the substituents R and R¹ are as described previously.

If less than about 1.67 moles of para alkylated phenol or para alkylated ortho-cresol is used per mole of formaldehyde, excessive amounts of trimeric or longer chain novolacs will form. These larger molecule novolacs are undesirable because they are too biscous and present handling problems. On the other hand, where the proper ratios are used, the product is essentially a bisphenol and is reasonably fluid upon heating to a temperature of from 80° to 100° C. There is no advantage to using more than two moles of para alkylated phenol or para alkylated ortho-cresol per mole of formaldehyde because only two moles of phenol can combine with one mole of formaldehyde. Therefore, any excess of alkylated phenol used would merely be a contaminant of the product.

The temperature at which the phenol is condensed with the aldehyde is not critical. However, at temperatures below about 55° C., the reaction proceeds slowly. There is no advantage to using temperatures in excess of 90° C. as both reagents are volatile and precautions would of necessity be required to minimize reagent loss. We prefer to use a condensation temperature of about 65° C. as we have obtained excellent results at this temperature.

Although normally the reaction time of the aldehyde with the phenol or cresol ranges from about 2 to about 6 hours, we may use shorter or longer periods of time. Naturally, the time of reaction would also depend upon the temperature of reaction. Higher temperatures permit a shorter reaction time and correspondingly the lower temperatures would require a longer reaction time. If the heating is continued for more than the required amount of time, it will not adversely affect the bisphenol except possibly to darken its color somewhat.

(B) *Preparation of the bisphenol of the hydroxy component.*—The resultant bisphenol prepared as described above, is then reacted with ethylene oxide or propylene oxide in an amount sufficient to provide for an average of from about 1 to about 2 moles, preferably from about 1.1 to about 1.5 moles, of ethylene or propylene oxide for each phenolic hydroxyl group within the bisphenol to form the alklated aromatic glycol which forms the major substance of the hydroxy component. The ethylene oxide or propylene oxide addition is carried out by reacting the bisphenol with ethylene or propylene oxide at a temperature ranging from about 150 to about 200° C. If desired, the reaction may be carried out under pressure, e.g. up to 85 p.s.i. in the presence of about 0.1% of alkali hydroxide or alkali metal carbonate as catalyst, said 0.1% being based on the total weight of the bisphenol.

If less than one molar equivalent of ethylene oxide or propylene oxide is used per each molar equivalent of phenolic hydroxyl groups, then some of the phenolic hydroxyl groups would remain unreacted and would not be converted to alcoholic hydroxyl groups. The presence of phenolic hydroxyl groups is undesirable because of their tendency to oxidize and dissolve and because materials having phenolic hydroxyl groups react quite slowly with acids. Generally speaking, we prefer to use at least 1.1 moles of ethylene oxide or propylene oxide for each phenolic hydroxyl group in order to assure the complete reaction of all the phenolic hydroxyl groups. On the other hand, while more than two moles of ethylene or propylene oxide may be used for each hydroxyl group, it is not desirable to do so, since we have discovered that an excess of ethylene or propylene oxide would reduce the solubility of the resulting glycol in non-polar solvents and would render polyurethanes prepared from the glycol hydrophilic. If the temperatures of the bisphenol-ethylene oxide or propylene oxide reaction is less than 150° C., the reaction will proceed at a slower rate. While the reaction can be accomplished at temperatures below 150° C., such is not desirable as the rate of reaction would be too slow for commercial application. It is likewise not desirable for the reaction temperatures to exceed 200° C. because the product would be unnecessarily darkened by such a high temperature.

If less than 0.1% of the catalyst is used, the reaction will proceed slowly. If more than 0.1% is used then the product will be contaminated with this inorganic catalytic material. When such alkaline catalysts are so employed they should be neutralized prior to the reaction of the polyester with the polyisocyanate to form our novel prepolymers in order to prepare a prepolymer that has an extended fluid shelf life. Any anhydrous inorganic acid, e.g. hydrogen chloride, may be used to effectuate the neutralization. We have found it preferable to dissolve such acid material in an organic solvent such as isopropyl ether to facilitate the neutralization. However, this invention is not to be construed as limited to any particular mode of preparing the glycol.

As indicated before, in preparing the glycols which are used to form the novel prepolymers of this invention, R is an alkyl group of from eight to twelve carbon atoms such as n-octyl, isooctyl, p-tertiary octyl, nonyl, dodecyl and the like such as their various isomers. When R is less than eight carbon atoms, the solubility of the prepolymer in non-oxygenated non-polar solvents, such as benzene, toluene, xylene, naphthalene, kerosene, hexane, Stoddard's Solvent, Varnish Makers and Painters Naphtha, and the like diminishes very rapidly. It is likewise true that R should not be greater than twelve carbon atoms. This is true since we have found that as R increases beyond twelve carbon atoms, the ratio between the reactivity of the prepolymer and the weight of the prepolymer is steadily diminishing, so that greater weights of the prepolymer would be needed for the same degree of reactivity as is present when R is, at most twelve. Hence, more than twelve carbons in R is unnecessary and an undesirable dilution.

(C) *Preparation of the polyester.*—The polyester portion of the prepolymers of this invention is prepared by reacting from about 1.3 to about 3 moles of the alkylated aromatic glycol (if the alkylated aromatic glycol makes up 100% of the hydroxy component) with one mole of a saturated or unsaturated dicarboxylic acid or anhydride or mixtures thereof at temperatures of from about 150° C. to about 200° C. for a period of time ranging from about 2 to 4 hours. The preparation of the polyester is preferably carried out until an acid value of under 5 is reached, preferably under 1. Among the dicarboxylic acids or anhydrides which can be used to form the polyesters are maleic acid, maleic anhydride, fumaric acid, itaconic acid, citraconic acid, mesaconic acid, adipic acid, sebacic acid, phthalic acid, phthalic anhydride, isophthalic acid, terephthalic acid, mixtures thereof and the like.

In the preparation of the polyesters found useful in our invention, we have found that, in some cases, it is useful to replace part of the glycol with a triol having a molecular weight of less than 250 to form a hydroxy component. As examples of some of the triols which may be mixed with the alkylated aromatic glycol hereinbefore defined to form the hydroxy component which is reacted with dicarboxylic acids or anhydrides thereof are trimethylol propane, trimethylol ethane, glycerine, hexanetriol, etc., polyether triols such as trimethylol propane condensed with up to 10 mols of ethylene oxide and mixtures thereof. In this manner, a polyester will be formed that is the reaction product of a hydroxy component containing the alkylated aromatic glycol and a triol with a dicarboxylic acid or the anhydride thereof. We have found that when a mixture of the alkylated aromatic glycol and the triol is reacted with the dicarboxylic acid to form the polyester portion of the prepolymer of this invention, it is advisable to react a sufficient amount of the hydroxy component with the dicarboxylic acid so as to provide about 1.3 to 3 free hydroxyl groups for each mole of dicarboxylic acid. The triols may easily be incorporated with the glycol prior to reacting with the dicarboxylic acid, by thoroughly mixing them with the aromatic glycols prepared as shown above. The polyester is formed by thereafter reacting the hydroxy component as aforesaid with the saturated or unsaturated dicarboxylic acid or anhydride or mixtures thereof. The replacement of part of the alkylated aromatic glycol with a triol results in the formation of polyesters having much greater branching in their structure. Further, it greatly increases and facilitates a curing of the resin system in which the prepolymers of our invention are used. In a manner similar to the use of the triols, other glycols having a molecular weight of less than about 1000, such as ethylene glycol, propylene glycol, butylene glycol, and dihydroxy ether polymers may replace part of the alkylated aromatic glycol in the mixture which forms the hydroxy component. The glycol having a molecular weight of less than 1,000 may be used alone or in conjunction with the alkylated aromatic glycol or may be used in combination with triols.

In all cases, however, in order to produce the prepolymers of this invention, the mixture which is reacted with the dicarboxylic acid should contain at least about 60% by weight, of the weight of the hydroxy component of the alkylated aromatic glycol having the aforementioned formula. If more than 40% by weight of the mixture which is reacted with dicarboxylic acids is provided by glycols other than the aromatic glycol hereinbefore described in the aforementioned formula and triols, then the resultant prepolymer will not exhibit the desired solubility in non-oxygenated, non-polar solvents and the other beneficial properties of the coating of this invention. Of course, the presence of these added glycols and triols greatly reduces the cost of preparing the novel prepolymers of our invention because they replace a portion of the more expensive aromatic glycol. Moreover, the incorporation of other glycols into the prepolymer tends to reduce the time required to produce our novel prepolymers and to reduce the viscosity of the solution of the novel prepolymers of our invention in inexpensive, non-oxygenated, non-polar solvents.

(D) *Preparation of the prepolymer*.—The prepolymers of this invention are prepared by reacting the polyesters prepared as aforedescribed, with a diisocyanate in an amount sufficient to provide a ratio of about 1.5 to 2.2 isocyanate groups per free hydroxyl groups contained in the polyesters. This reaction may take place at a temperature of from about 20 to about 60° C. maintained for a period of from about four to five hours until the desired isocyanate content is reached. In the preferred embodiment of our invention, a diisocyanate is reacted with the polyester in an amount sufficient to provide a ratio of two isocyanate groups per hydroxyl group.

Whether or not the desired isocyanate content has been reached is determined by removing a sample of the reaction mixture and titrating the sample against di-n-butyl amine. Since the amine only reacts with free isocyanate groups, it is a simple matter to calculate the degree to which the reaction has proceeded.

While it is possible to react the diisocyanate with the polyetser to form the prepolymer at temperatures below about 20° C., such low temperatures are not desired as the time required for completion of the reaction would be unduly extended. If temperatures in excess of 60° C. are used in forming the prepolymer there is the risk that at these temperatures there will be a build-up of both the molecular weight and viscosity of the final product giving an undesirable final product. The length of time of the reaction of the polyester with the diisocyanate is not critical and is determined by the results of the analysis of the free isocyanate content.

Diisocyanates can be utilized to advantage in preparing the novel polyester prepolymers of our invention. In the preferred embodiment of our invention, we can use diisocyanates such as commercial mixtures of diisocyanates like 80% by weight of 2,4-toluene diisocyanate and 20% by weight of 2,6-toluene diisocyanate.

Among the diisocyanates whtich can be used to prepare the compositions of this invention are meta-phenylene diisocyanate, para-phenylene diisocyanate, para-para'-diphenyl diisocyanate, and substituted products thereof such as diphenyl-3,3'-dimethyl-4,4'-diisocyanate, and diphenyl-3,3'-dimethoxy-4,4'-diisocyanate; 1,5 - naphthalene diisocyanate, diphenylmethane-4,4' - diisocyanate; pentamethylene-omega-omega' diisocyanate; hexamethylene omega-omega' diisocyanate, toluene diisocyanate, diphenyl diisocyanate, triphenyl diisocyanate, chloro-phenyl-2,4-diisocyanate, decamethylene diisocyanate, and the like. Where toluene diisocyanate is used we may use pure toluene 2,4-diisocyanate or a commercial mixture composed of about 80% by weight of 2,4-toluene diisocyanate and 20% by weight of 2,6-toluene diisocyanate.

If desired, we may block the free isocyanate groups of the prepolymers with any conventional blocking agent before the prepolymer is used as a coating. By blocking the free isocyanate groups, we render the prepolymer relatively inert when stored thus prolonging the shelf life of the prepolymer for later use as a coating material and/or later reaction. Generally speaking, a slight excess over one molar equivalent of the blocking agent for each molar equivalent of free isocyanate group in the prepolymer can be employed. A slight excess is used to assure complete blocking of the free isocyanate groups. The manner of blocking is shown in the art and need not be discussed here; however, generally speaking, blocking may be accomplished by adding the blocking agent and 0.2% by weight of the total weight of the entire mixture, of a tertiary amine as a catalyst to the prepolymer. The reaction is then carried out at a temperature of from about 75° C. to 80° C. until a sample of the reaction mixture when titrated with di-n-butyl amine for free isocyanate groups, gives an isocyanate value of zero. Exemplary of useful blocking agents are phenol or substituted phenols, such as cresols, chlorophenols, and the like, or we may use tertiary alcohols, such as tertiary butanol and the like. We prefer to use phenol because it is relatively inexpensive, reliable and easily removed at reasonable temperatures. In addition to the blocking agents listed above which can be removed merely by heating, we may use sodium bisulfite as a blocking agent. The last mentioned blocking agent is not readily removed by heating, but is removed by lowering the pH of the solution to below about 4.

When we desire to unblock the prepolymer, we may do so by heating the prepolymer at a temperature of from about 125° C. to 175° C. and higher. We prefer, however, to use temperatures of 150° to 160° C. as we have found these temperatures to be effective. However, higher temperatures may be used when a very rapid cure is desired.

The prepolymers of this invention may be applied directly to the substrate which is to be coated. The prepolymer which is coated on the substate can be cured to form an insoluble hard coating by the action of the humidity from the atmosphere. Alternatively, a hard coating may be formed by mixing the prepolymer of this invention with a material containing at least two active hydrogens. In this case both the material and the prepolymer should be mixed just prior to coating the substrate so as to allow the material and the prepolymer to react on the surface to be coated. This is true since reaction between the prepolymer of this invention containing free and unreacted isocyanate groups and the material containing at least two active hydrogens to form a hard coating occurs within a few hours at room temperature. Generally if quicker curing times are desired the prepolymer and the active hydrogen containing material may be heated to a temperature of from 75° to 180° C. By utilizing these temperatures curing can be accomplished in a matter of minutes. If the free isocyanate groups of the prepolymer are blocked in the manner hereinbefore described, the prepolymer and the material may be mixed and stored prior to applying them as a coating on the surface to be coated. In this case the hard coating is formed by heating the mixture to a temperature sufficient to unblock the prepolymer.

The materials with which the prepolymers of this invention may react to form insoluble coatings are materials which contain at least two reactive hydrogen atoms as determined by the Zerewitinoff method. This method is described in the "Journal of the American Chemical Society," 49, 3181 (1927). Typical groups containing reactive hydrogen atoms are hydroxyl, carboxyl and primary and secondary amino groups. Exemplary of materials containing at least two active hydrogens are: glycols, such as ethylene glycol, propylene glycol, etc.; polyols, such as pentaerythritol, glucose, sucrose, dextrose, sorbitol, mannitol, etc.; hydroxy terminated polyesters, such as those prepared by the reaction of dibasic acids with polyols, glycols, etc., polyesters containing two active hydrogen atoms such as the polyester of adipic acid and ethylene glycol, etc.; polyamines, such as diethylene triamine, triethylene tetramine, tetraethylene pentamine, hexamthylene heptamine, and the like; cellulose and cellulose derivativs, such as cellulose acetate, cellulose butyrate, etc.; proteins, such as wool, leather, and the like. Further, resins which contain at least two active hydrogen atoms can be reacted with the prepolymer of this invention to form an insoluble hard coating. These resins include linear vinyl resins containing some hydroxyl or amino groups, such as partially hydrolyzed vinyl acetate-vinyl chloride copolymers; incompletely acetalized polyvinyl alcohols, copolymers containing some allyl amine, and the like. The resins that are to be reacted with the prepolymer of this invention can be linear or slightly branched chain resins so that the resins are soluble in solvents normally used as for example in paints. On the other hand the resins may be fusible so that they can be extruded or otherwise shaped before they are reacted with the prepolymer of this invention.

Typical diisocyanates which can be utilized to react with the polyester polymers of this invention are those which have been disclosed hereinbefore. The prepolymers containing about two free isocyanate groups may be prepared by reacting polyols, polyesters having free hydroxy groups and polyethers with any polyisocyanate, such as toluene diisocyanate in an amount sufficient to provide three isocyanate groups per free hydroxyl groups. Exemplary of some of the typical polymers that can be reacted with an isocyanate to form prepolymers which can be utilized to cure the prepolymers of our invention include glycerine, trimethylol ethane, trimethylol propane, pentaerythritol, etc. Polyethers which can be utilized to form prepolymers which can be utilized in accordance with our invention include polyoxyethylene glycols polymers having molecular weights of 200, 400, 600, 800, 1,000, 2,000 and 4,000; polyoxypropylene glycols having molecular weights of 400 to 4,000, such as the Pluracol P series of Wyandotte Chemical Corp.; and copolymers prepared by the sequential addition of ethylene oxide to polyoxypropylene glycols. The copolymers can be represented by the formula $HO(C_2H_4O)_a(C_3H_6O)_b(C_2H_4O)_cH$. The molecular weight of the base, i.e., the polyoxypropylene portion of the molecule can vary, e.g., from about 600 to 2,500. Hence, in these instances, each $b$ in the above formula can vary from about 10 to 43. The oxyethylene content can vary from, e.g., 10% to 20% by weight of the total. Exemplary of these materials having a molecular weight of between 800 and 1,000 for the base portion of the molecule, i.e., the polyoxypropylene portion, and from 10% to 20% by weight of the ethylene oxide in the molecule are materials having a molecular weight of between 2,101 and 2,500 and having from 10% to 20% by weight of ethylene oxide in the molecule. Other polyethers which may be utilized in this invention are the ethylene oxide and propylene oxide condensates of glycerine, 1,2,6-hexanetriol, trimethylol propane, pentaerythritol, etc.

Polyester resins which can be utilized to form prepolymers containing about two isocyanate groups in accordance with this invention can be obtained by reacting one or more polyhydric alcohol having at least two hydroxyl groups with one or more dibasic acids or their anhydrides. Exemplary of the polyhydric alcohols which can be used in producing the polyesters are ethylene glycol, diethylene glycol, trimethylol propane, trimethylol ethane, glycerol, pentaerythritol, sorbitol, mannitol, etc. and mixtures of the above. Of course, when a diol is used, there may be present some amount of triol, tetrol, or other polyhydric alcohol having a functionality greater than two in order to incorporate branching into the polyester. Exemplary of the dibasic acid and anhydrides which can be used in the production of the polyester resin are malonic acid, oxalic acid, adipic acid, sebacic acid, azelaic acid, itaconic acid, terephthalic acid, isophthalic acid, phthalic anhydride, maleic anhydride, etc. and their mixtures.

The free isocyanate groups of this invention are reacted to prepare a durable hard coating on the surface upon which it is coated. This hard coating may be produced by polymerizing the prepolymer of this invention either by reacting the isocyanate groups of the prepolymer of this invention with water such as moistures from the atmosphere, alone or in conjunction with a material containing at least two active hydrogen atoms. Among the substrates which can be coated using the prepolymer compositions of this invention are paper, wood, cloth, glass fibers, concrete, metals, other resinous or plastic materials, etc.

Alternatively, in forming the hard, durable and flexible coating produced in accordance with this invention, the polyesters of this invention containing free and unreacted hydroxyl groups, said polyesters being the reaction product of the aromatic glycol hereinbefore described and the dicarboxylic acid, may be reacted with a polyisocyanate or a prepolymer containing at least three unreacted or free isocyanate groups in the amount sufficient to provide at least one isocyantae group for each free hydroxyl group within the polyester. The polyisocyanate or the prepolymer containing at least three free or unreacted isocyanate groups may be mixed with the polyester of this invention just prior to applying this mixture as a coating to the surface to be coated. Alternatively, the polyester of this invention and the polyisocyanate compound or the prepolymer containing at least three free isocyanate groups can be applied simultaneously to the surface to be coated. In this case a hard rigid coating composition is produced by the reaction of the isocyanate groups with the active hydrogen atom of the polyester and by the crosslinking provided by the polyisocyanate. If there are any excess isocyanate groups over that required to react with the hydroxyl groups of the polyester and to crosslink the polyester, these excess isocyanate groups can be cured by reacting with the moisture in the atmosphere. The reaction of the polyester of this invention with the isocyanate groups of the prepolymer containing at least three free isocyanate groups takes place in a few hours at room temperature by exposure to the atmosphere. If quicker curing times are desired, the mixture may be heated to any temperature below about 200° C. depending upon the time of curing desired. Temperatures above 200° C. may be utilized, but are not desired due to the expense of heating to these temperatures.

In the examples which follow, unless otherwise indicated, all percentages given are percents by weight.

In order to more fully illustrate the nature of this invention and the manner of practicing the same, the following examples are presented.

*Example I*

This example illustrates the preparation of an aromatic glycol 4,4'-tertiary octyl bisphenol. All parts are by weight unless otherwise specified:

(A) *Preparation of the bisphenol.*—7.97 parts by weight of trioxane were added to 91.15 parts by weight of p-tertiary octyl phenol and the resulting mixture heated to 55° C. until the phenol melted. The tertiary octyl substituent was derived from diisobutylene and has the following structure:

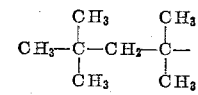

Diisobutylene is primarily a mixture of 2,4,4-trimethylpentene-1, and 2,4,4-trimethylpentene-2. 0.88 parts by weight of a 37% by weight concentrated hydrochloric acid solution was carefully added to the mixture of trioxane and phenol and the temperature allowed to rise to 95° C. and maintained at 95° C. for 6 hours during which time the reaction mass was vigorously agitated. Thereafter, the reaction mass which was a pinkish-white viscous material was neutralized with 0.96 parts by weight of a 50% by weight aqueous potassium carbonate solution and agitated for an additional half hour. The mass was then brought up to a temperature of 150° C. while under a nitrogen atmosphere and this temperature was maintained for 2 hours. The product, which was essentially a bisphenol, was a pinkish tacky resin having a total alkali content of 0.05%.

(B) *Preparation of the bisphenol ethylene oxide condensate.*—96.8 parts by weight of ethylene oxide were slowly added to 424 parts by weight of the bisphenol of Part A in the presence of 0.4 parts by weight of potassium carbonate as a catalyst which was dispersed in the bisphenol. The temperature was maintained at 170° C. during the ethylene oxide addition. The resulting condensate which was the aromatic based glycol was purged with nitrogen. It was a clear amber, tacky resin at room temperature.

*Example II*

The purpose of this example illustrates the preparation of a prepolymer containing a polyester formed from the glycol prepared in Example I and toluene diisocyanate.

(A) *Preparation of the polyester.*—87.3 grams of adipic acid, 27.0 grams of 1,4-butanediol, 26.1 grams of hexane triol, and 161 grams of the aromatic glycol prepared in Example I dissolved in 76 cc. of xylene were introduced into a reaction vessel equipped with a heating mantle, stirrer, moisture trap, condenser, thermometer, and spargers. The mixture in the vessel was heated at a temperature of about 170° C. under a nitrogen atmosphere for approximately 40 hours with constant stirring so as to react the ingredients and form the polyester while the water was removed from the reaction mixture, in the form of a water-xylene azeotrope. During the heating, approximately 21.5 grams of water were collected as a result of the xylene-water azeotrope. The acid number of the resultant polyester was 0.

(B) *Preparation of the polyester prepolymer.*—70.0 grams of the polyester prepared in Part A of this example were dissolved in xylene in order to make a solution containing 70% by weight of the polyester and 30% by weight of xylene. Anhydrous hydrogen chloride dissolved in isopropyl ether was then added to the xylene solution until a pH of 6.0 was obtained. The xylene solution was then added to a reaction vessel equipped with a stirrer, and thermometer, containing 18.9 grams of a commercial mixture of 80% by weight 2,4-toluene diisocyanate and 20% by weight 2,6-toluene diisocyanate under a dry nitrogen atmosphere. 16.3 grams of Cellosolve acetate were then added as a solvent for the mixture. The mixture was then heated for 4 hours at a temperature of about 35° C. under a dry nitrogen atmosphere with constant stirring so as to form the prepolymer. A sample of the heated prepolymer was titrated with di-n-butylamine. This titration indicated that the non-volatile free isocyanate content of the prepolymer was 6.5%.

*Example III*

This example is similar to Example II with the exception that the aromatic glycol used is methylated so as to fully hinder the formation of novolac resins.

(A) *Preparation of the polyester.*—86.4 grams of adipic acid, 26.4 grams of butanediol, 26.1 grams of hexane triol and 161.1 grams of the aromatic glycol produced by the condensation of 2,2'-dihydroxy-3,3'-dimethyl-5,5'-ditertiary octyl-diphenyl methane with about 2 moles of ethylene oxide per mole of the diphenyl methane and dissolved in 65 cc. of xylene were introduced into a reaction vessel equipped with a heating mantle, stirrer, moisture trap, condenser, thermometer, and spargers. The mixture in the vessel was heated to a temperature of about 150° C. under a nitrogen atmosphere for approximately 40 hours so as to form a polyester while a xylene azeotrope was used to remove water from the system. During the heating, approximately 21.3 grams of water were collected as a result of the xylene-water azeotrope. The acid number of the resultant polyester was slightly below 1.

(B) *Preparation of the polyester prepolymer.*—70.0 parts of the polyester prepared in Part A of this example were dissolved in xylene in order to make a xylene solution containing 70% by weight of the polyester. The pH of this solution was adjusted to a pH of 6.0 with gaseous anhydrous HCl. This xylene solution was then added to a reaction vessel equipped with a stirrer and a thermometer. This vessel contained 20.2 grams of a commercial mixture of about 80% by weight of 2,4-toluene diisocyanate and about 20% by weight of 2,6-toluene diisocyanate under a dry nitrogen atmosphere. 16.3 grams of xylene were then added to dissolve the mixture. This mixture was then heated for 4 hours at a temperature of about 35° C. under a dry nitrogen atmosphere with constant stirring so as to form the prepolymer. A sample of the prepolymer was titrated with di-n-butylamine. The titration indicated that the non-volatile, free isocyanate content of the prepolymer was 6.5%.

*Example IV*

This example is directed to producing a prepolymer utilizing hexane triol in the hydroxyl component.

(A) *Preparation of the polyester.*—71.4 grams of adipic acid, 43.5 grams of hexane triol and 185.1 grams of the aromatic glycol produced by the condensation of 4,4'-tertiary-octyl bisphenol with 2.2 mols of ethylene oxide per mole of bisphenol (said aromatic glycol being dissolved in 30 cc. of xylene) were introduced into a reaction vessel equipped with a heating mantle, stirrer, moisture trap, condenser, thermometer, and spargers. The mixture in the vessel was heated at a temperature of about 200° C. under a nitrogen atmosphere for 4 hours with constant stirring so as to form the polyester. During the formation of the polyester, the water of condensation was removed by means of forming a low boiling xylene water azeotrope. During heating, approximately 19.0 grams of water were collected as a result of the xylene azeotrope. The acid number of the resultant polyester was 3.6.

(B) *The preparation of the polyester prepolymer.* — 70.0 grams of polyester prepared in Part A of this example were dissolved in xylene in order to make a xylene solution containing 70% by weight of the polyester. The pH of the solution was adjusted with gaseous anhydrous hydrogen chloride until a pH of about 6.5 was obtained. The xylene solution was then added to a reaction vessel equipped with a stirrer and thermometer. This reaction vessel contained 15.6 grams of a commercial mixture of 80% by weight of 2,4-toluene diisocyanate and 20% by weight of 2,6-toluene diisocyanate under a dry nitrogen atmosphere. 13.3 grams of xylene were then added to the mixture. The mixture was then heated for three hours at a temperature of about 35° C. under a nitrogen atmosphere with constant stirring, so as to form the prepolymer. A sample of the prepolymer was titrated with di-n-butylamine. The titration indicated that the nonvolatile free isocyanate content of the prepolymer was 7.1%.

*Example V*

This example demonstrates the preparation of a completely unbranched prepolymer.

(A) *Preparation of the polyester.*—The polyester prepared in this example was linear in structure and substantially free of any branching. 40.2 parts of phthalic anhydride, 59.4 grams of polypropylene glycol (having a molecular weight of approximately 1100), and 200.4 grams of aromatic glycol produced by the condensation of 2,2'-dihydroxy-3,3'-dimethyl-5,5'-ditertiary octyl diphenyl methane with 2.2 moles of ethylene oxide per mole of the diphenyl methane (said glycol being dissolved in 85.6 cc. of xylene) were introduced into a reaction vessel equipped with a heating mantle, stirrer, moisture trap, condenser, thermometer, and spargers. The mixture in the vessel was heated at a temperature of about 200° C. under a dry nitrogen atmosphere for approximately 40 hours to form the polyester while the water produced by this condensation reaction was removed from the polyester by means of a low boiling water-xylene azeotrope. During the heating, approximately 4.5 grams of water were collected as a result of the xylene-water azeotrope. The acid number of the resultant polyester was 3.5.

(B) *The preparation of the polyester prepolymer.*—51.2 grams of polyester prepared in Part A of this example were dissolved in xylene in order to make a xylene solution containing 80% by weight of the polyester. Gaseous anhydrous hydrogen chloride was added to the xylene solution until a pH of 6.7 was obtained. The polyester solution was then added to a reaction vessel equipped with a stirrer and thermometer containing 8.2 grams of a commercial mixture of about 80% by weight of 2,4-toluene diisocyanate and about 20% by weight of 2,6-toluene diisocyanate under a dry nitrogen atmosphere. 7.5 grams of anhydrous mineral spirits were then added to dissolve the mixture. The mixture was then heated for one hour at a temperature of about 55° C. under a dry nitrogen atmosphere with constant stirring so as to form the prepolymer. A sample of the prepolymer was titrated with di-n-butylamine which indicated that the non-volatile free isocyanate content of the prepolymer was approximately 3.3%. The product prepared in this example was completely soluble in kerosene, mineral spirits, benzene, xylene, hexane, Stoddard solvents, and toluene.

*Example VI*

This example demonstrates the preparation of an unbranched prepolymer using a glycol which is not alkylated in accordance with the aforementioned formula.

(A) *Preparation of the polyester.*—A polyester was made from a commercially available glycol bisphenol sold by the Dow Chemical Company under the trademark "DOW X 2635." This product is an aromatic glycol prepared by condensing bisphenol A (4'4'-dihydroxy diphenyl dimethyl methane) with 1 mol of ethylene oxide per phenolic hydroxyl group. 54.9 grams of phthalic anhydride, 81.3 parts of polypropylene glycol (having a molecular weight of approximately 1100), and 63.8 grams of Dow X–2635 dissolved in 50 cc. of anhydrous xylene were introduced into a reaction vessel equipped with a heating mantle, stirrer, moisture trap, condenser, thermometer, and spargers. The mixture in the vessel was heated at a temperature of about 200° C. under a nitrogen atmosphere for approximately 40 hours with constant stirring so as to form the polyester. The water formed during the condensation reaction was removed from the mixture by means of a low boiling water-xylene azeotrope. During this heating, approximately 6.4 grams of water were collected as a result of the xylene-water azeotrope. The acid number of the resultant polyester was 3.5.

(B) *Preparation of the prepolymer.*—72 grams of the polyester prepared in Part A of this example were dissolved in xylene in order to make a xylene solution containing 70% by weight of the polyester. Anhydrous hydrogen chloride was then added to the solution until a pH of 6.7 was obtained. This xylene solution was then added to a reaction vessel equipped with a stirrer, and thermometer containing 12.4 grams of a commercial mixture of 80% by weight 2,4-toluene diisocyanate and 20% by weight 2,6-toluene diisocyanate under a dry nitrogen atmosphere. 15.6 grams of anhydrous xylene were then added to the mixture. The mixture was then heated for four hours at a temperature of about 35° C. under a dry nitrogen atmosphere with constant stirring so as to form the prepolymer. A sample of this prepolymer was titrated with di-n-butylamine. This titration indicated that the non-volatile free isocyanate content of the prepolymer was 4.2. The product prepared in this example was not soluble in kerosene, mineral spirits, benzene, xylene, hexane, Stoddard solvents, and toluene.

*Example VII*

This example is directed to preparing a resin coating according to this invention.

73.6 grams of the polyester prepared in Part A of Example II were dissolved in 31.5 grams of xylene to prepare a solution. This solution was mixed with 47.3 grams of "CB–75." "CB–75" is a triisocyanate formed by condensating one molar equivalent of trimethylol propane with three molar equivalents of toluene diisocyanate dissolved in Cellosolve acetate (75% triisocyanate by weight) manufactured and sold by the Mobay Chemical Company. 1.6 grams of xylene were added to dissolve the mixture, and to obtain a fluid resin mixture. Smooth steel plates were then placed in a blower type oven having a temperature of 150° C. for one-half hour to cure the resin coating on the plate by reacting the polyester with the isocyanate.

The cured resin coating on the plates was smooth, transparent and passed a 4H pencil hardness test. The cured coatings on these plates exhibited excellent abrasion and solvent resistance. They were not damaged upon immersion in liquid solutions containing water, alcohol, methyl isobutyl ketone, alcohol, detergent, and aqueous solutions containing 5% sodium hydroxide.

*Example VIII*

This example is directed to preparing a resin coating according to this invention.

88.3 grams of the polyester prepared in Part A of Example III were dissolved in xylene to produce a solution containing 70% by weight of the polyester. This solution was mixed with 47.3 grams of "CB–75." 4.0 grams of xylene were added to the mixture to dissolve the mixture and to obtain a fluid resin mixture. Smooth steel plates were coated with the resin mix and the plates were then placed in a blower type oven having a temperature of 150° C. for one-half hour to cure the resin coating on the plate by reacting the polyester with the isocyanate.

The cured resin coating on the plates was smooth, transparent and passed a 4H pencil hardness test. The cured coatings on these plates exhibited excellent abrasion and solvent resistance. They were not damaged upon immersion in liquid solutions containing water, alcohol, methyl isobutyl, ketone, alcohol, detergent, and aqueous solution containing 5% sodium hydroxide.

*Example IX*

This example is directed to preparing a resin coating according to this invention.

71.6 grams of the polyester prepared in Part A of Example IV were dissolved in 30.6 grams of xylene to form a solution. This solution was mixed with 38.1 grams of "CB–75." 4.8 grams of xylene were added to the mixture to dissolve the mixture and to form a fluid resin mixture. Smooth steel plates were coated with the resin mix and the plates were then placed in a blower type oven having a temperature of 150° C. for one-half hour to cure the resin coating on the plate by reacting the polyester with the isocyanate.

The cured resin coating on the plates was smooth, transparent, and passed a 4H pencil hardness test. The cured coatings on these plates exhibited excellent abrasion and solvent resistance. They were not damaged upon immersion in liquid solutions containing water, alcohol, methyl isobutyl ketone, alcohol, detergent, and aqueous solutions containing 5% sodium hydroxide.

Example X

This example is directed to preparing a resin coating according to this invention.

98.8 grams of the polyester prepared in Example V were dissolved in 42.3 grams of xylene to form a solution. This solution was mixed with 25.2 grams of "CB-75." 1.6 grams of xylene were added to the mixture to dissolve the mixture and to obtain a fluid resin mixture. Smooth steel plates were coated with the resin mix and the plates were coated with the resin mix and the plates were then placed in a blower type oven having a temperature of 150° C. for one-half hour to cure the resin coating on the plate by reacting the polyester with the triisocyanate.

The cured resin coating on the plates was smooth, transparent, and passed a 4H pencil hardness test. The cured coatings on these plates exhibited excellent abrasion and solvent resistance. They were not damaged upon immersion in liquid solutions containing water, alcohol, methyl isobutyl ketone, alcohol, detergent and aqueous solutions containing 5% sodium hydroxide.

The prepolymers prepared in all of the examples as shown above had excellent flow properties upon completion of their preparation. The prepolymer prepared in Example V was completely soluble in mineral spirits, kerosene, benzene, xylene, hexane, Stoddard solvents, and toluene. However, the prepolymer prepared in Example VI was not soluble in mineral spirits, kerosene, benzene, xylene, Stoddard solvents and toluene. Since solvents such as mineral spirits are inexpensive petroleum distillates widely used in the coating industry as solvents, it is important for a prepolymer such as ours to possess such a characteristic. Furthermore, since the basic structural difference between the prepolymers in Examples V and VI is the fact that the prepolymer prepared in Example V contained an alkylated aromatic glycol while that in Example VI contained a nonalkylated aromatic glycol. This difference in solvency could not be predicted by empirical reasoning because of the fact that the size of the alkyl groups in prepolymers of Example V are relatively small in comparison to the entire size of the prepolymers formed. This solvency difference is further strikingly illustrated by the fact that products formed in Examples VII through X are soluble in xylene whereas the prepolymer formed in Example VI is not.

Having described our invention what we claim as new and desire to secure by Letters Patent is:

1. A polyester prepolymer soluble in non-polar solvents comprising the reaction product of
   (A) a polyester having free and unreacted hydroxyl groups, said polyester being the reaction product of
       (1) a component containing free hydroxy groups, said component comprising at least 60% by weight of said hydroxy component, of an aromatic glycol having the structure

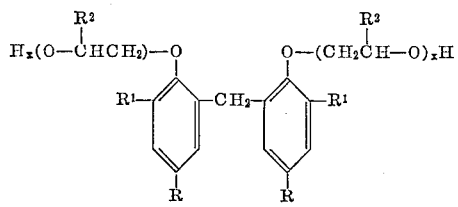

wherein R is an alkyl group containing from about 8 to 12 carton atoms, $R^1$ and $R^2$ are selected from the group consisting of methyl and hydrogen, and $x$ varies from 1 to 2, with
       (2) a material selected from the class consisting of saturated and unsaturated aliphatic and aromatic dicarboxylic acids and anhydrides thereof, said component being present in amounts sufficient to provide about 1.3 to about 3 free hydroxy groups for each mole of said material present, and
   (B) isocyanate having about two free isocyanate groups, said isocyanate being present in sufficient amount to provide a ratio of from about 1.5 to 2.2 isocyanate groups for each free and unreacted hydroxyl group contained within said polyester.

2. A polyester prepolymer according to claim 1, wherein said material is adipic acid.
3. A polyester prepolymer according to claim 1, wherein R is a saturated alkyl group containing 9 carbon atoms.
4. A polyester prepolymer according to claim 1, wherein $R^1$ is a methyl group.
5. A polyester prepolymer according to claim 1, wherein $R^1$ is hydrogen.
6. A polyester prepolymer according to claim 1, wherein $R^2$ is hydrogen.
7. A polyester prepolymer according to claim 1, wherein $R^2$ is a methyl group.
8. A polyester prepolymer according to claim 1, wherein said material is phthalic anhydride.
9. A polyester prepolymer according to claim 1, wherein said isocyanate is toluene diisocyanate.
10. A polyester prepolymer according to claim 1, wherein these is present at least one additional glycol in said hydroxy component, said glycol being present in said hydroxy component before formation of said polyester.
11. A polyester prepolymer according to claim 10, wherein said additional glycol is 1,4-butanediol.
12. A hard, flexible coating comprising the reaction product of a polyester prepolymer soluble in non-polar solvents, and an organic substance containing at least two active hydrogen atoms, said polyester prepolymer being the reaction product of
    (A) a polyester having free and unreacted hydroxyl groups said polyester being the reaction product of
        (1) a component containing free hydroxy groups, said component comprising at least 60% by weight of a glycol having the structure

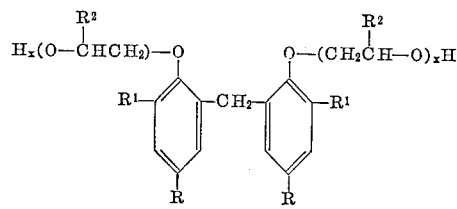

wherein R is an alkyl group containing from about 8 to 12 carbon atoms, $R^1$ and $R^2$ are selected from the group consisting of methyl and hydrogen, and $x$ is an integer of from 1 to 2 with
        (2) a material selected from the class consisting of saturated and unsaturated aliphatic and aromatic dicarboxylic acids and anhydrides thereof, said component being present in amounts sufficient to provide about 1.3 to about 3 free hydroxy groups for each mole of said material present, and
    (B) an isocyanate compound having about two free isocyanate groups, said isocyanate being present in sufficient amount to provide a ratio of from about 1.5 to 2.2 isocyanate groups for each free and unreactant hydroxyl group contained within the polyester.

13. A hard flexible coating according to claim 12 wherein said organic substance is a polyol.
14. A hard flexible coating according to claim 12 wherein said organic substance is a glycol.

15. A hard flexible coating comprising the reaction product of
(A) a polyester having free and unreacted hydroxyl groups said polyester soluble in non-polar solvents being the reaction product of
(1) a component containing free hydroxyl groups, said component comprising at least 60% by weight of a glycol having the structure

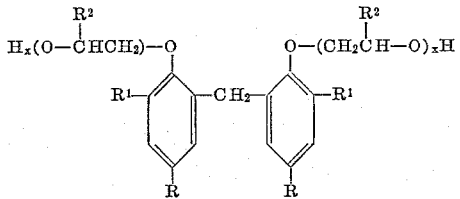

wherein R is an alkyl group containing from about 8 to 12 carbon atoms, $R^1$ and $R^2$ are selected from the group consisting of methyl and hydrogen, and $x$ is an integer of from 1 to 2 with (2) a material selected from the class consisting of saturated and unsaturated aliphatic and aromatic dicarboxylic acids and anhydrides thereof, said component being present in amounts sufficient to provide about 1.3 to about 3 free hydroxy groups for each mole of said material present, and
(B) an isocyanate having at least three free isocyanate groups, said isocyanate being present in an amount sufficient to provide at least one isocyanate group for every free hydroxyl group in said polyester.

References Cited by the Examiner
UNITED STATES PATENTS 2,861,981   11/1958   Frank et al. _____ 260—75
3,140,221   7/1964    Liebling et al. _____ 260—871
3,245,957   4/1966    Hindersinn et al.

WILLIAM H. SHORT, *Primary Examiner.*
C. A. WENDEL, *Assistant Examiner.*